Oct. 4, 1938.    D. J. CAMPBELL    2,131,935
MOLDING MACHINE
Original Filed Dec. 3, 1934    8 Sheets-Sheet 1

Fig. 1.

INVENTOR
DONALD J. CAMPBELL
BY
ATTORNEYS

Oct. 4, 1938.  D. J. CAMPBELL  2,131,935
MOLDING MACHINE
Original Filed Dec. 3, 1934    8 Sheets-Sheet 2

Fig. 2.

INVENTOR
DONALD J. CAMPBELL
BY Liverance & Van Antwerp
ATTORNEYS

Oct. 4, 1938.  D. J. CAMPBELL  2,131,935
MOLDING MACHINE
Original Filed Dec. 3, 1934    8 Sheets-Sheet 5

Fig. 5.

INVENTOR
DONALD J. CAMPBELL
BY Liverance & Van Antwerp
ATTORNEYS Oct. 4, 1938.     D. J. CAMPBELL     2,131,935
MOLDING MACHINE
Original Filed Dec. 3, 1934    8 Sheets-Sheet 6

INVENTOR
DONALD J. CAMPBELL
BY
ATTORNEYS

Oct. 4, 1938.    D. J. CAMPBELL    2,131,935
MOLDING MACHINE
Original Filed Dec. 3, 1934    8 Sheets-Sheet 8

INVENTOR
DONALD J. CAMPBELL
BY Liversage & Van Antwerp
ATTORNEYS

Patented Oct. 4, 1938

2,131,935

UNITED STATES PATENT OFFICE 2,131,935

MOLDING MACHINE

Donald J. Campbell, Muskegon Heights, Mich.

Application December 3, 1934, Serial No. 755,688,
Renewed October 7, 1936

17 Claims. (Cl. 22—25)

This invention relates to molding machines. It is a primary object and purpose of the present invention to provide a novel construction of molding machine wherein molds for the casting of metal forms may be quickly, rapidly and economically produced.

The invention consists in many novel cooperative constructions and arrangements of parts for attaining the above stated ends as well as many others not at this time particularly enumerated, and may be understood from the following description, taken in connection with the accompanying drawings, in which.

Like reference characters refer to like parts in the different figures of the drawings.

In the construction of the machine, a vertical supporting column 1, cylindrical at its upper portion, is modified as to cross section at its lower portion as indicated at 2, providing a vertical front face 3 against which a housing 4 for part of the mechanism of the machine is located and permanently bolted or otherwise secured. Near the lower end of the cylindrical portion of the column 1 a horizontal supporting collar 5 is secured about which is a ring 6 which may turn around the column 1 and between which and the collar 5 are suitable anti-friction bearings. A downwardly and outwardly extending shield or skirt 7 from the ring 6 partially covers the collar 5 and serves to exclude dirt, sand or the like from the bearing. A suitable releasable latch 8 is carried by the collar 5 to engage in suitable recesses at spaced apart intervals at the underside of the ring 7 to thereby stop the ring and the hoppers, (later described) which are carried thereby so as to properly position the hoppers in the three stations which they are designed to occupy in the operation of the machine. A covering ring 9, having a depending flange, is located above the ring 6 around the column, protecting against the entrance of sand, grit or the like between the inner surfaces of the ring and the column 1 about which it turns.

Figure 1:
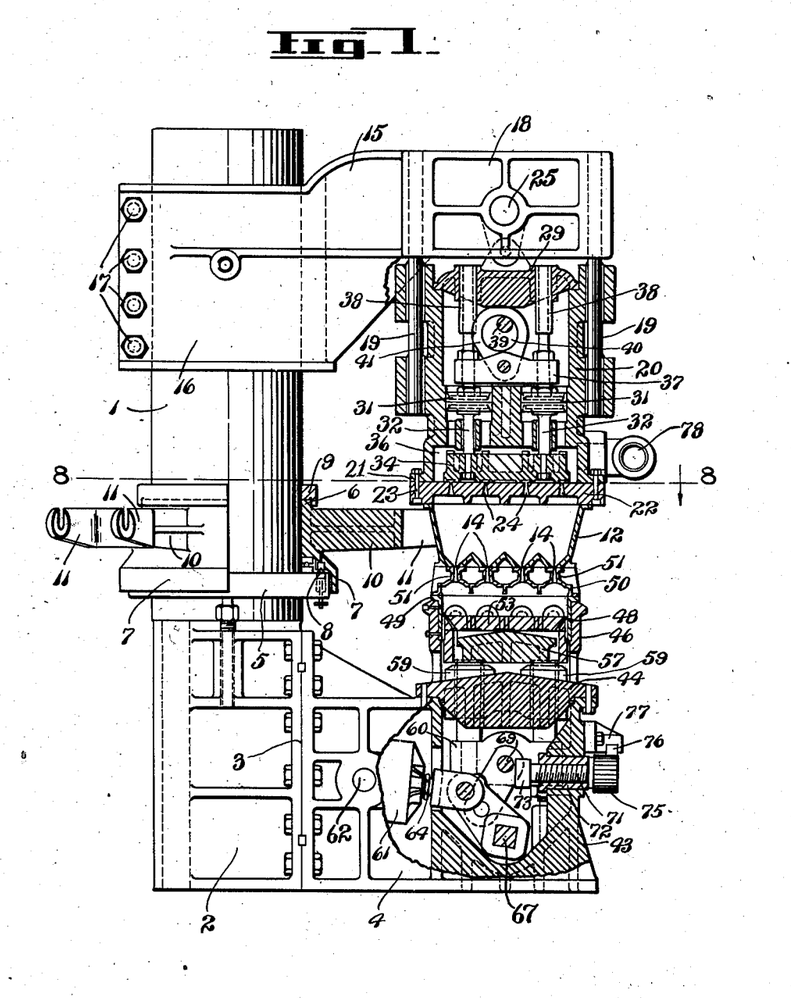
Fig. 1 is a side elevation of the molding machine of my invention with parts thereof shown in vertical section.
Figure 2:
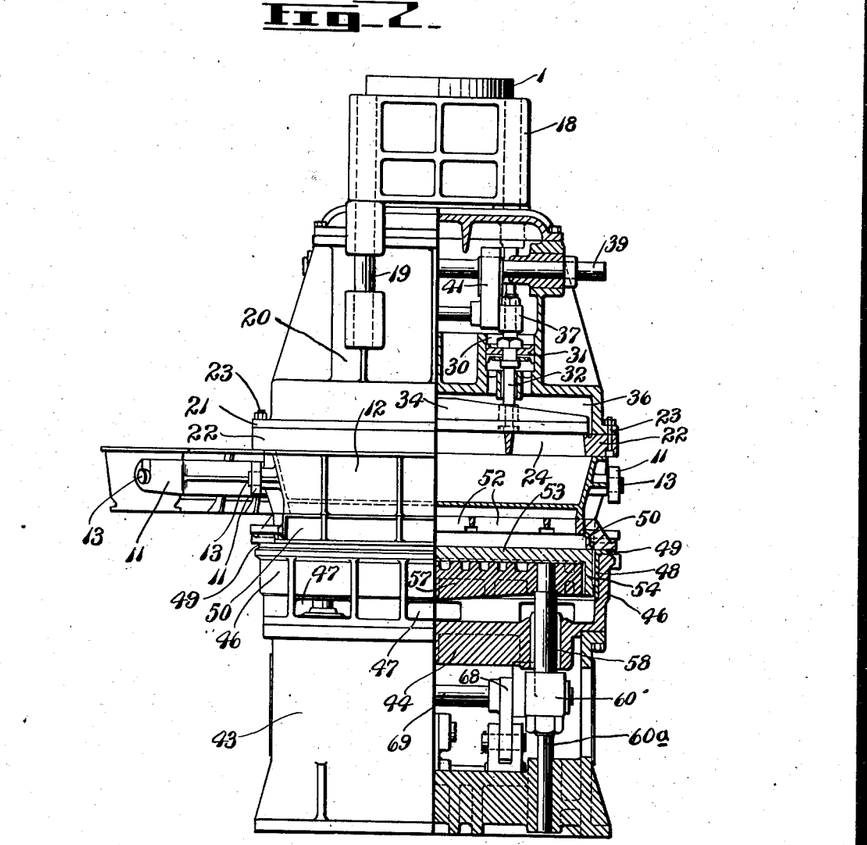
Fig. 2 is a front elevation and vertical section, one-half substantially of the figure showing an elevation and the remaining half a vertical section in a plane back of the front of the machine.
Figure 3:
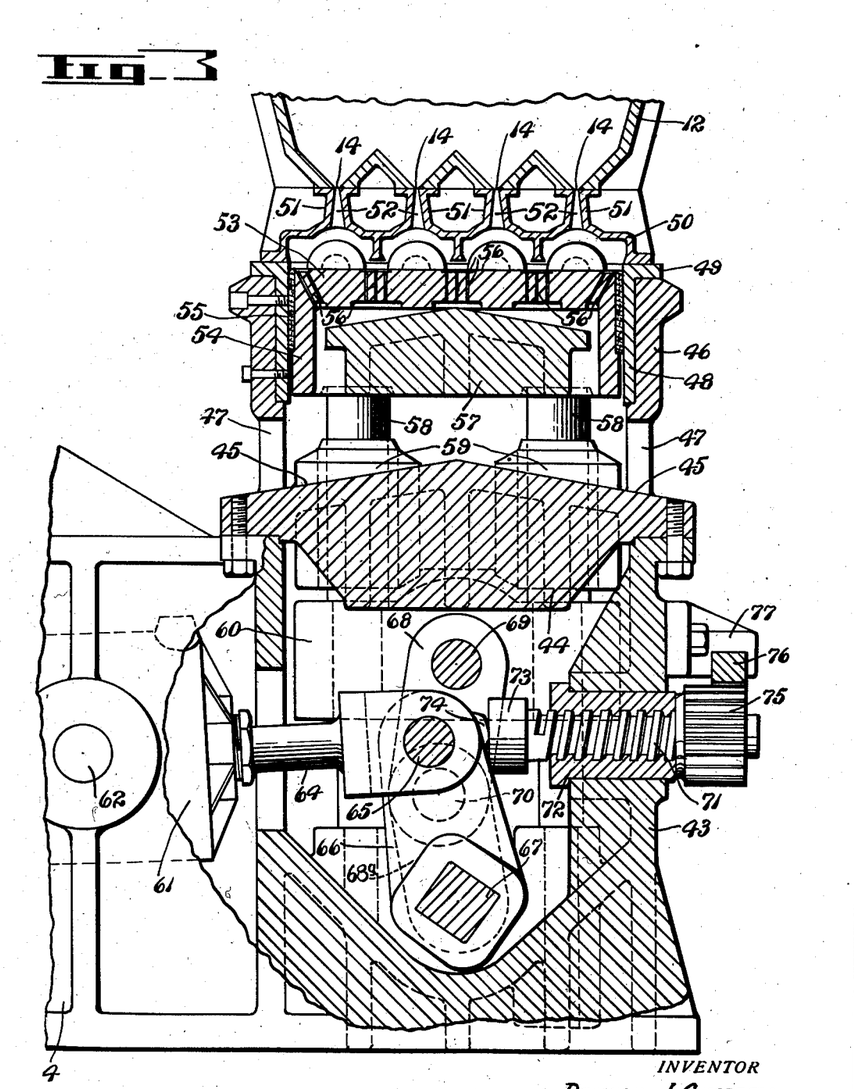
Fig. 3 is a fragmentary enlarged vertical section showing the match plate and patterns thereon in the position which they occupy when sand is forced into the flask over said patterns, the match plate being perforated to exhaust the air after the impact blow, and also illustrating the mechanism used to raise the match plate to such position, which mechanism is also used for drawing the patterns from the mold.
Figures 6, 7:
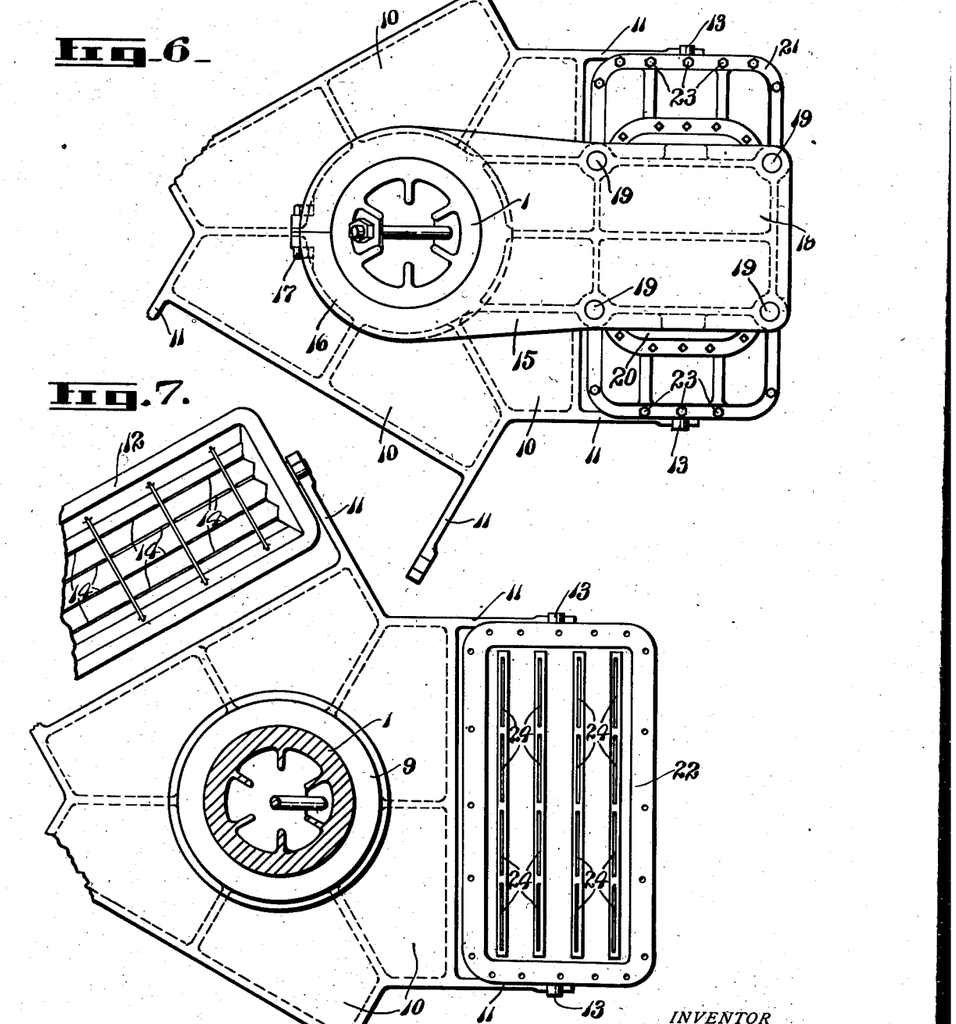
Fig. 6 is a fragmentary plan of the molding machine.
Fig. 7 is a horizontal section and plan substantially on the plane of line 7—7 of Fig. 1 looking downwardly and showing one of the sand holding hoppers in position at the station for filling the same with sand.
Figure 8:
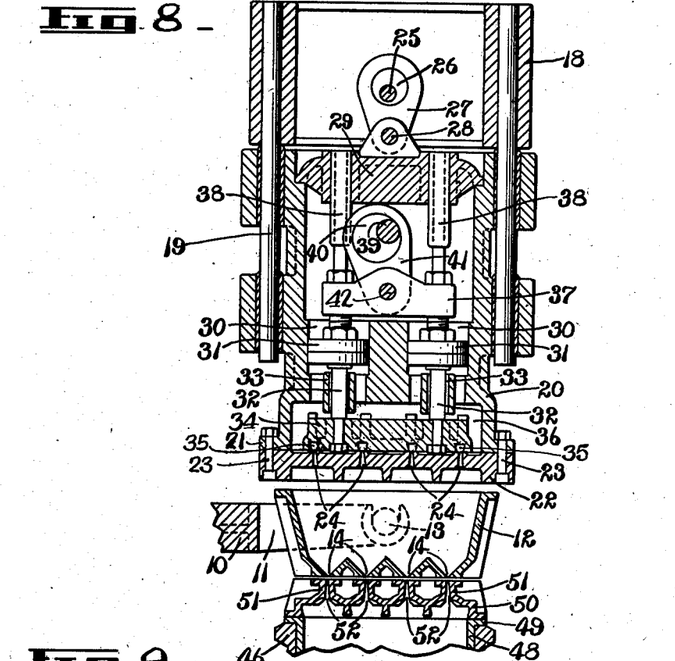
Fig. 8 is a vertical sectional view illustrating the sand holding hopper between the flask and the overhead compressed air chamber and controlling mechanism therefor, the same being elevated to permit the hopper to pass between the flask and said chamber, or to be swung away therefrom for subsequent cleaning and refilling with sand.

A plurality of projecting arms or supports 10, three in number, extend horizontally from the ring. In the construction shown, at the outer ends of each of the supports 10 are two spaced apart arms 11. The arms 11 are equipped with receiving sockets near their ends and a sand holding hopper 12 with oppositely extending trunnions 13 at its ends are mounted between the arms of each pair of arms 11, the trunnions being received in said sockets. Each of the hoppers at its bottom is constructed as illustrated in Figs. 1, 3 and 6 and as shown in plan in Fig. 8, that is, with a plurality of narrow elongated sand outlets 14 shown as parallel to each other and disposed in the bottoms of longitudinal troughs made in the bottom of the hopper between the intermediate raised portions of the hopper bottoms.

Several hoppers are used and each hopper is successively moved from a filling station where it receives sand to the next station where the sand is forced from the hopper into the flask, then to a third station where the hopper is cleaned and made ready to be again filled when it passes to the filling station after cleaning.

Near the upper end of the supporting cylindrical column 1 a strong and heavy horizontal arm 15 is located provided with a divided collar 16 to pass around the cylinder 1 and which is clamped against the cylinder by tightening the clamping bolts 17. The arm 15 terminates in a horizontally located head 18 which is directly above the station at which a hopper filled with sand is stopped for the purpose of being operated upon by the mechanism to force the sand therefrom into the flask and against the match plate and patterns carried thereby. Four cylindrical guide rods 19 depend from what may be called the corners of the head 18. The rods 19 serve to guide a compressed air chamber member 20 slidably mounted thereon below the head 18.

The member 20 is hollow and has passages therethrough from its upper to its lower end. The lower end of the member 20 is open and around the open end there is an outwardly extending annular flange 21. This lower end of the member or body 20 is closed by a plate 22 permanently bolted to the flange 21 by bolts 23. The plate 22 has a plurality of spaced apart ports 24 vertically therethrough which progressively increase in size downward as shown.

A horizontal shaft 25 is rotatably mounted on and extends through the head 18. Within the head 18 the shaft carries eccentrics 26 which are mounted within one end portion of a depending link 27 the lower end of which is pivotally connected to shaft 28 connected to a top closing member 29 which closes the upper end of the member 20 and which is permanently secured thereto. It is evident that by turning the shaft 25 so that the eccentrics occupy the position shown in Fig. 9, the member 20 and all mechanism and parts connected therewith may be elevated a short distance, the distance depending upon the throw of the eccentric. Also, by turning the shaft back the member 20 and the parts carried thereby may be lowered a short distance, being guided in its vertical movements on the guide rods 19 previously described.

Within the member 20 and between its ends are a plurality of vertical cylinders 30 in each of which a piston 31 is mounted. Each piston is connected to a piston rod 32. The portion of each rod below the piston passes through a guide sleeve 33. Said rods 32 at their lower ends are permanently connected to a valve member 34 which is in the form of a rectangular relatively heavy block and at the underside of which to cover all of the ports 24 sealing members 35 of rubber or equivalent material are secured, as fully shown in Fig. 6. The interior space in the lower portion of the member 20 between the upper side of the lower closing plate 22 and the lower sides of the pistons 31 constitute a chamber 36 into which compressed air is entered.

In the design shown there are four of the rods 32 and four pistons 31. Above the pistons and the cylinders in which they operate said rods pass through horizontal members or bars 37 and continue above the same into guide sleeves 38 which extend downwardly from the upper closing member 29. A second shaft 39 with eccentrics 40 thereon, similar to the shaft 25 with the eccentrics 26 thereon, extends through and is rotatably mounted on the member 20. Links 41 have their upper end portions around the eccentrics 40. The links extend downwardly and are pivotally connected at 42 to the members 37 previously described. It is evident that on rotating the shaft 39 from the position shown, for example in Fig. 5, the members 37, rods 32, piston 31 and valve member 34 are elevated and the ports 24 uncovered. Such elevation is rendered more easy by reason of balancing the pressure against the upper side of the valve member 34 in part by the same pressure against the lower sides of the pistons 31, that is, the same compressed air pressure works upon both. Rotation of the shaft 39 in one direction serves to lift the valve 34 and by turning the same back the valve 34 is lowered to close the ports 24.

At the forward end of the housing 4 is an integral auxiliary housing 43, the upper end of which is closed by a top 44. The upper side of the top 44 is inclined downwardly and outwardly in both directions from the middle providing downwardly and outwardly inclined surfaces 45 for the ready blowing of sand away therefrom. The top 44 is extended upwardly at its sides to provide a frame 46 with openings 47 below the frame and above the member 44 as shown.

An auxiliary frame 48 is located within the frame 46 and is provided with a continuous outwardly extending horizontal flange 49 which bears upon the upper edges of the frame 46 and forms a supporting ledge for the flask 50 which is placed in inverted position upon said ledge. In such position, as in Fig. 3 or 6, there are upwardly extending elongated projections 51 which have passages 52 therein the upper ends of which come into direct conjunction with the narrow elongated outlet passages 14 in the bottom of the hopper 12, whereby upon introducing compressed air into the upper side of the hopper against the sand therein, the sand is forced downwardly through the openings 14 and passages 52 into the flask and against the match plate which carries patterns projecting into the flask.

The match plate 53 is a horizontal plate with suitable patterns at its upper side. At its outer edges integral downwardly extending sides and ends 54 are provided which lie within the sides and ends of the auxiliary frame 48. A suitable packing 55 is disposed between the adjacent outer and inner sides of the parts 54 and the sides and ends of the auxiliary frame 48. The match plate has a plurality of vent openings 56 therethrough for the escape of air which will pass through the sand both in the hopper and in the flask when the sand is forced by compressed air into the flask. The match plate is recessed adjacent the several vents and receives screen sections A in these recesses as shown in Fig. 12. This screen prevents sand from passing through these small vents or openings. (See Fig. 6.)

The match plate rests upon a head member 57 the upper sides of which are downwardly and outwardly inclined like the upper sides 45 of the member 44 for the same purpose. The head 57 in turn is supported by suitable cylindrical posts or rods 58 passing downwardly through and guided in sleeve guides 59 formed in the top 44. Below the top 44 the posts 58 are connected by horizontal heavy bars 60, that is, the two posts at each end are connected by one of said bars. Such bars in lower portion rest on enlarged heads at the upper ends of posts 60a.

Figure 4:
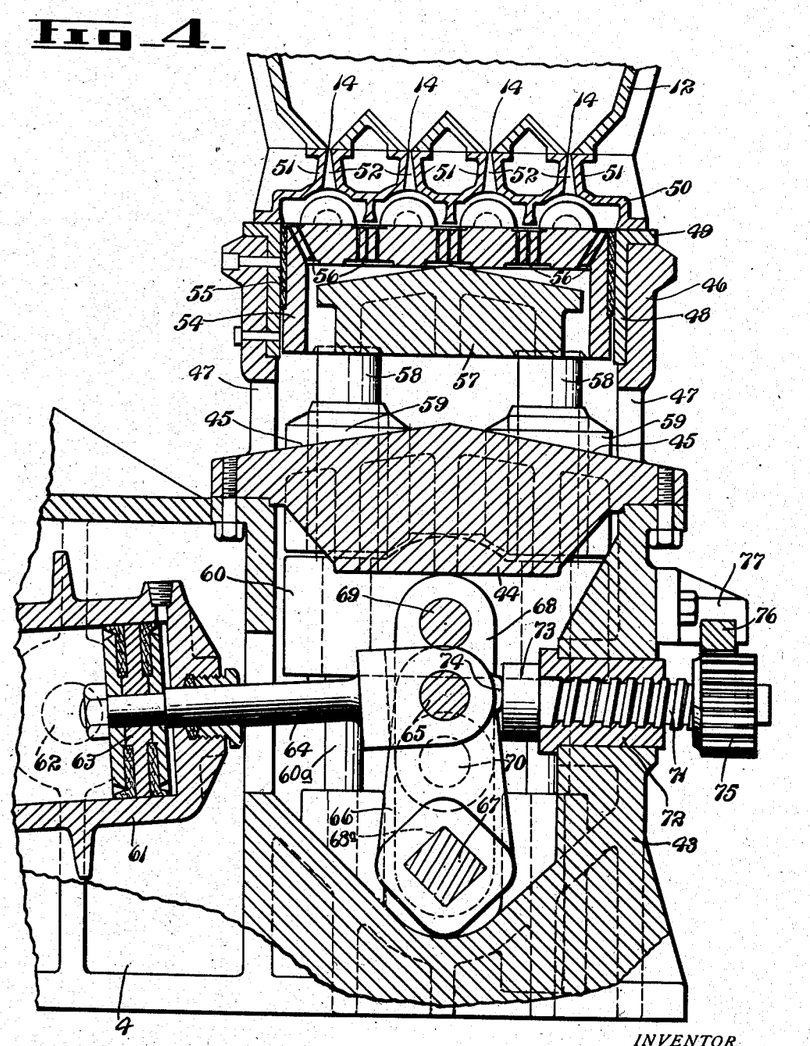
Fig. 4 is a sectional view similar to Fig. 3 showing the match plate moved upwardly a short distance beyond the position shown in Fig. 3 for the purpose of squeezing the sand after it has been deposited by impact force in the flask.

A cylinder 61 is mounted on horizontal trunnions 62 formed in the sides of the housing 4, the cylinder being located in said housing. Within the cylinder is a piston 63 connected with a piston rod 64 which extends through the end of the cylinder and has pivotal connection at 65 with the upper end of a crank arm 66 mounted to turn upon the axis of a rock shaft 67 mounted horizontally in the lower portion of the auxiliary housing 43. Toggle link structures comprising upper links 68 and lower links 68a are disposed between the rock shaft 67 and a rod 69 extending between the bars 60. Links 68 and 68a are pivotally connected at their ends at 70. It is evident that on the movement of the piston to the right, (Fig. 4), the links are straightened and brought toward alinement and that the posts 58 are elevated in accordance with the extent of movement of the toggle link structures. Elevation of the posts elevates the head 57 and moves the match plate and the patterns thereon upwardly.

A square threaded shaft 71 passes through an interiorly threaded sleeve 72 mounted in the front of the axis housing 43. It is equipped with a stop head 73 at its inner end which extends into the path of movement of a stop lug 74 on the end of the piston rod 64. A gear 75 is secured to the outer end of the threaded shaft 71 meshing with which is a rack bar 76 mounted for sliding movement in suitable brackets 77 secured to the auxiliary housing 43.

Figure 5:
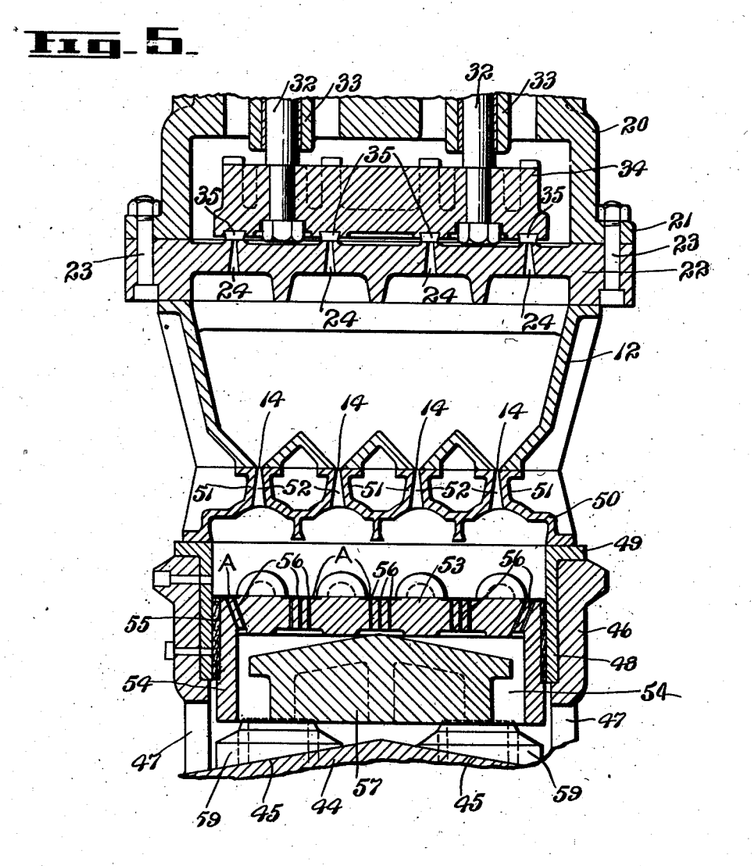
Fig. 5 is a fragmentary vertical section illustrating the lowermost position of the match plate and patterns after the same have been drawn from the completed mold.

Compressed air is entered into the chamber 36 through any suitable conduit, such as illustrated at 78 in Figs. 1 and 5. With the valve member 34 in its closed position as shown in Figs. 5 and 9 the compressed air cannot escape from the chamber 36.

Figure 9:
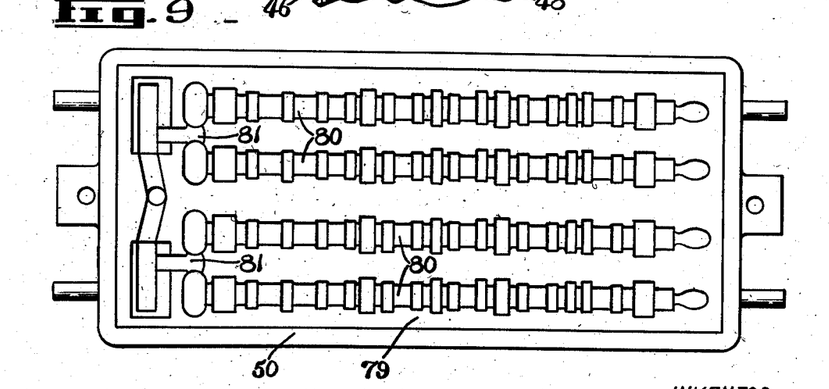
Fig. 9 is a plan of a flask having half of a mold therein illustrating mold cavities for the casting of cam shafts.
Figure 10:
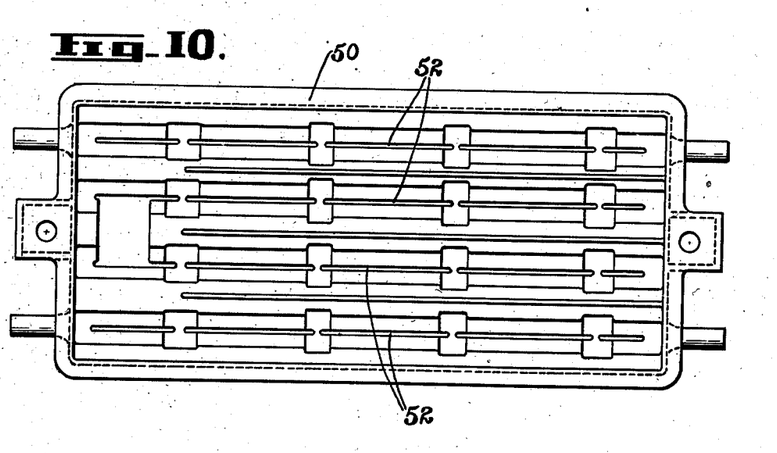
Fig. 10 is an underplan view of the flask.

In the operation of the machine with the stop head 73 in the position shown in Fig. 3, a flask 50 is inverted and placed upon the ledge provided by the flanges 49, as shown in Fig. 10. The shaft 25 is rocked so as to move the eccentric to the position shown in Fig. 9, whereby the member or body 20 which contains the compressed air chamber 36 is lifted a short distance, occupying the position shown in Fig. 9. A hopper 12, filled with the required amount of sand, is then swung into position between the flask 50 and the lower side of the plate 22. The hopper will be stopped at the proper position through the engagement of the retaining latch or dog 8 in the recess 7 of ring 6 (Fig. 1).

The next operation is to turn the shaft 25 to lower the member 20 and bring the lower side of the plate 22 against the outwardly extending flange of the open upper end of the hopper 12. Then by a slightly further turning of the shaft 25 a heavy pressure may be exerted upon the hopper which will bring its lower or bottom side against the upper ends of the projections 51 on the flask. This pressure is sufficient to spring the arms 11 downwardly and a tight seal is provided between the upper end of the hopper 12 and the lower side of the plate 22 and between the lower side of the hopper and the sand entrance projections 51 of the flask. Turning the eccentric 26 so that its point farthest removed from the axis of the shaft 25 is directly underneath the axis of the rod 25 locks the parts described in sealed position.

After this has been done shaft 39 is turned from the position shown in Figs. 5 and 9 to lift the valve plate 34. The compressed air passes through the ports 24 and against the sand in the hopper 12 forcing the sand into the flask and around the patterns extending upwardly from the match plate 53 and against the upper side of the match plate.

The position of the match plate and patterns carried thereby when the sand is forced into the flask is that shown in Fig. 3. It will be noticed that the upper face of the match plate 53 is a short distance below the plane of the upper side of the flanges 49. This is accomplished by locating the threaded shaft 71 and the stop head 73 at the inner end thereof with said head 73 positioned inwardly a short distance from the inner end of the sleeve 72, as in Fig. 3. Compressed air is entered into the cylinder 61 which moves the piston and piston rod to the right until the lug 74 engages the head 73. This is done at the beginning of the operation. In such position the toggle links 68 and 68a are not brought into direct vertical alinement and the upward movement of the match plate is stopped so that the upper side of the match plate is the short distance previously described below the plane of the upper side of the flanges 49.

After the compressed air has done its work upon the sand, forcing the same into the flask 50, the valve at 34 is closed by turning the shaft 39 in the proper direction. The mold is then completed by operating the rack 76 lengthwise so as to withdraw the screw threaded shaft 71 and the head 73 to the position shown in Fig. 4. With this withdrawal, the compressed air in the cylinder 61 moves the piston farther to the left straightening the toggle links 68 and 68a into alinement and lifting the match plate a short distance until its horizontal upper side is in the plane of the upper sides of the flanges 49. This squeezes the sand which has been forced into the flask into a smaller compact volume. It is the final step of completing the mold and compressing or packing the sand to the required density.

After this operation of squeezing the sand the pattern is withdrawn from the mold. This is accomplished by releasing the compressed air in the cylinder 61 whereupon the piston, piston rod and toggle link elevating structure move back to the position in Fig. 1 thereby permitting the match plate and patterns thereon to gravitate downwardly to leave the mold which has been formed in the flask.

The flask with the mold therein is then ready to be removed from the machine. To remove the flask the upper shaft 25 is rotated to elevate the member 20 to the position shown in Fig. 9. This releases the hopper 12 from the flask and it may be swung out of the way if desired and the flask removed or the flask can be slid out from under the hopper without swinging the same to the hopper cleaning position. Whether or not the flask is removed before or after the hopper has been swung away the hopper from which the sand has been projected into the flask is swung to a position where it may be cleaned of the sand which is left therein preparatory to swinging said hopper to still another position where it is filled with new sand for another operation. It is, of course, evident that with three hoppers and with three stations of operation, each hopper as it comes to the filling station is filled with sand, is then taken to the machine and sand forced from the hopper to provide a mold, and is then swung away from the mechanism to the position or station at which it is cleaned. Therefore, there is one of the three hoppers at each of the three positions, one hopper being filled with sand, one in the machine having sand forced therefrom to make a mold, and one in the process of cleaning previous to being swung to the filling position.

Figure 11:
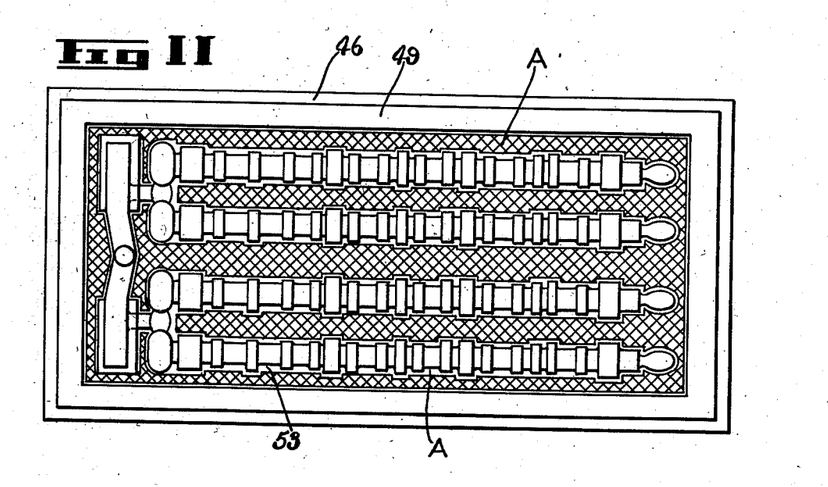
Fig. 11 is a plan view of the match plate.

The completed mold is shown in Fig. 10. It is indicated at 79 as held within the flask 50 and with two parallel series or pairs of mold cavities 80, each pair being connected at one end by a gate 81. The flask is of special construction having an integrally cast bottom plate with slotted openings for the admission of sand from the hopper above into the mold. See Figs. 3 and 11. Either a drag or cope may be joined with a cooperating drag or cope to complete the mold. Into the completed mold molten iron may be poured in accordance with the usual practice to fill the mold cavities. The mold cavities shown are in connection with the casting of cam shafts for internal combustion engines. However, the machine described is not restricted in any sense to the casting of cam shafts alone.

The structure described is very practical and efficient and with it very rapid quantity production of duplicate molds may be performed economically. Various modifications in detail of structure may be resorted to without departing from the invention which is defined in the claims. The invention is therefore not restricted to the particular disclosure made but is to be considered comprehensive of all forms of structure coming within the scope of said claims.

I claim:

1. In molding apparatus, a vertical hollow support over the upper end of which a flask is placed in inverted position, a horizontal match plate with pattern thereon at its upper side mounted for vertical movements within said support, a plunger carrying said match plate, means for raising and lowering the plunger, adjustable stop means for limiting the upward movement of the plunger whereby the match plate may be moved upwardly to a predetermined position, means for forcing sand through the upper side of the inverted flask into said flask and against the match plate and pattern, and means for operating said adjustable stop whereby the match plate and pattern may be moved upwardly a short predetermined distance after the sand has been forced therein, said match plate and pattern being withdrawable from the sand mold held in the flask upon downward withdrawal of said plunger.

2. In molding apparatus, a stationary vertical hollow support, a vertically movable plunger mounted therein, a cylinder adapted to receive fluid pressure, a piston in said cylinder and a piston rod projecting from the piston at one end of the cylinder, a fixed frame member, toggle link connections associated with the piston rod, the fixed frame member and the plunger for raising and lowering the plunger upon outward and inward movements of said piston, an adjustable stop mounted on the support in the path of movement of the piston rod for controlling the extent of upward movement of said plunger, and a match plate with pattern thereon carried at the upper side of the plunger and guided within said hollow support.

3. In a molding apparatus, a vertical hollow support, the upper end of which provides an open rectangular frame portion, a plunger mounted for vertical movements in said support, a match plate having depending sides and ends located within said frame and guided thereby in vertical movements, said match plate being carried at the upper end of the plunger, a power means for raising and lowering the plunger, adjustable stop means for limiting the extent of movement upwardly of said plunger, and manually operable means for adjusting said stop means to different positions to selectively control the upper positions to which said plunger may be moved.

4. In a molding apparatus, a vertical hollow support, a plunger mounted within said support for vertical movements, a match plate having depending sides and ends and carrying a pattern at its upper horizontal side resting upon the upper end of the plunger and located within the upper end portion of said support, pivotally mounted lever means connected with said plunger, fluid power means for operating said lever means to raise and lower said plunger, a screw threaded through one side of said support, the inner end thereof being located in the path of movement of said fluid operating means whereby the extent of upward movement of the plunger may be controlled, and means for manually turning said screw to adjust the inner end thereof to different positions so as to stop the upward movement of the plunger at different positions.

5. In an apparatus of the class described, a vertical hollow support, a flask disposed in inverted position over the upper end of said support, said flask having a plurality of sand entrance openings in its upper side when located in such inverted position, a sand holding hopper having restricted openings in its bottom and open at its upper side, the openings in the flask and the openings in the hopper being in alinement and of substantially the same size, means for mounting the hopper whereby the same may be moved into position over the flask so that the openings in the bottom of the hopper and in the upper side of the inverted flask come into conjunction with each other, a match plate with a pattern thereon mounted in said support below the flask, and means for projecting fluid pressure into the hopper to act on the sand to force the same therefrom at its bottom into said flask and over and against the upper side of the match plate and pattern.

6. A construction containing the elements in combination defined in claim 5, combined with power means for lifting said match plate and patterns to a predetermined position and holding it in said position, and gravity means for lowering the match plate and patterns after the sand has been entered into the flask.

7. In molding apparatus, a vertical support, the upper end thereof providing an open frame, a flask located in inverted position at the upper end of said frame and covering the opening therein, a match plate with pattern thereon mounted within said frame for vertical movements, means for raising the match plate to a predetermined position, a sand holding hopper located over the flask, the bottom of said hopper and the upper side of the inverted flask having sand passing openings in conjunction with each other, a chambered housing located over the upper side of the hopper having a compressed air receiving chamber therein, the lower side of the housing having air passing openings, a member located within the housing over said openings adapted to close the same, and means for raising said member for the passage of compressed air therefrom to the sand in said hopper.

8. Molding apparatus comprising a vertical support, a flask disposed in inverted position on said support, a match plate and pattern thereon located at the lower open side of the flask, a sand holding hopper located over the flask, the bottom of the hopper and the upper side of the inverted flask having restricted openings in conjunction with each other, said openings facing each other to form closed passageways for the sand and air, a housing located over the hopper, said housing having a chamber therein adapted to receive compressed air, the bottom side of said housing having openings therethrough, a valve member in the chamber in its lower position closing said openings, and means for manually opening and closing said valve member.

9. In molding apparatus, a vertical column support, a supporting arm connected to the upper end of the column and extending horizontally outward therefrom, guide rods extending downwardly from the lower side of the outer end portion of said supporting arm, a housing having a chamber therein slidably mounted on said rods below said arm, a horizontal shaft extending through said arm above the housing, eccentrics on the shaft, links located around the eccentrics and extending downwardly therefrom, and pivotal connections between the lower ends of said links and the housing whereby the housing may be raised or lowered by rotating said shaft.

10. In a molding apparatus, a vertical hollow support open at its upper end, a match plate with pattern thereon vertically movable within said support and guided thereby, a vertically reciprocable plunger at the upper end of which the match plate is located, a cylinder, a piston therein, a piston rod connected with the piston and extending outwardly at one end of the cylinder, toggle link connections between the plunger and the lower part of the support, means for connecting the piston rod with said toggle link connections for operating the same to either raise or lower the plunger, a screw threaded rod extending through one side of the support having its inner end in the path of movement of the piston rod, a gear at the outer end of the screw threaded rod, and a manually movable horizontal rack mounted on the support in engagement with the gear, as specified.

11. A molding apparatus comprising, a match plate and pattern, a flask located in inverted position thereover, a hopper open at its upper side located over the flask, the bottom of the hopper and the upper side of the inverted flask having passages in conjunction with each other therethrough, a hollow housing having a chamber for receiving compressed air located over the hopper, the lower side of the housing having air passing openings therethrough, a valve located within said chamber for closing said air openings, means for manually moving said valve to open the openings, means for mounting the housing for vertical movements, means for manually raising or lowering said housing, said means including a horizontal shaft, eccentrics and links located around the eccentrics and extending downwardly and connected with the upper end of the housing, whereby rotation of the shaft in one direction elevates the housing and in the opposite direction lowers the same.

12. In a construction of the class described having a flask, said flask being open at both ends, the combination of, means located above the flask to supply air pressure to the top of said flask, this means comprising a hollow member having a plurality of cylinders formed intermediately and interiorly thereof, pistons slidable in said cylinders, a closure plate attached to the lower end of said hollow member, said closure plate having a plurality of valve openings therethrough, a valve member in the form of a relatively heavy block resting upon the closure plate to seal the several valve openings therethrough, rods extending from the said valve member upwardly to each of the said pistons, and means above the said pistons for operating the same and means for introducing air into the hollow member between the several pistons and the closure plate.

13. A combination of elements as set forth in claim 12, in which the valve member is provided with a plurality of rubber inserts, there being a rubber insert above each of the valve openings.

14. In combination, a support having four spaced rods extending downwardly therefrom, a hollow chambered means having extensions extending laterally therefrom, there being four of these extensions and each extension having an opening therein adapted to receive one of said spaced rods whereby the chambered means is mounted for sliding movement, actuating means for sliding the chambered means relative to the supports, closure plates located at the top and the bottom of the said chambered means, the bottom closure plate having a plurality of openings therein, a single valve plate resting upon said bottom closure plate and closing the openings therein, a plurality of rods extending upwardly from said valve plate, means for simultaneously pulling the said rods upwardly whereby the said valve openings are uncovered and means for supplying air to the chamber at its point immediately above said closure plate.

15. A combination of elements as set forth in claim 14 in which the said pulling means comprises a second plate through which the several rods pass, and a single means for moving the second plate upwardly.

16. A combination of elements as set forth in claim 14, said pulling means including a plurality of rods extending upwardly, a single means connected to the rods and movable to operate the same, said rods extending upwardly through the top closure plate and means attached to the said rods to prevent the flow of air therealong.

17. In combination, a hollow chamber having a plurality of cylinders formed interiorly thereof, a closure plate located at each end of said chamber, one of said closure plates having a plurality of valve openings therethrough, a valve plate located adjacent said valve openings and adapted to open and close the same, a plurality of pistons located in said cylinders, piston rods extending between each of the said pistons and the said valve plate, said piston rods continuing and extending through the other closure plate, means located within the chamber between the several pistons and the last mentioned closure means for operating the several piston rods simultaneously in either direction.

DONALD J. CAMPBELL.